US009750063B2

United States Patent
Zhu et al.

(10) Patent No.: US 9,750,063 B2
(45) Date of Patent: Aug. 29, 2017

(54) CONNECTION SETUP METHOD, APPARATUS, AND SYSTEM

(71) Applicant: HUAWEI TECHNOLOGIES CO., LTD., Shenzhen (CN)

(72) Inventors: Song Zhu, Beijing (CN); Yue Li, Shenzhen (CN); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 14/980,402

(22) Filed: Dec. 28, 2015

(65) Prior Publication Data

US 2016/0135236 A1 May 12, 2016

Related U.S. Application Data

(63) Continuation of application No. PCT/CN2013/078013, filed on Jun. 26, 2013.

(51) Int. Cl.
| | |
|---|---|
| H04W 4/00 | (2009.01) |
| H04W 76/02 | (2009.01) |
| H04B 7/26 | (2006.01) |
| H04W 76/00 | (2009.01) |
| H04W 28/06 | (2009.01) |
| H04W 28/02 | (2009.01) |

(Continued)

(52) U.S. Cl.
CPC ............ *H04W 76/021* (2013.01); *H04B 7/26* (2013.01); *H04W 4/00* (2013.01);
(Continued)

(58) Field of Classification Search
USPC ........ 370/329, 280, 315, 252, 311, 336, 338
See application file for complete search history.

(56) References Cited

U.S. PATENT DOCUMENTS

2007/0253421 A1  11/2007  Cai
2009/0022134 A1   1/2009  Chun et al.
(Continued)

FOREIGN PATENT DOCUMENTS

CN  101379732 A  3/2009
CN  101384078 A  3/2009
(Continued)

OTHER PUBLICATIONS

International Search Report dated Apr. 3, 2014 in corresponding International Patent Application No. PCT/CN2013/078013.
(Continued)

*Primary Examiner* — Phuongchau Ba Nguyen
(74) *Attorney, Agent, or Firm* — Staas & Halsey LLP

(57) ABSTRACT

Embodiments of the present invention provide a connection setup method, apparatus, and system. The method in the present invention includes: sending information about to-be-provided connection request resources to a user equipment UE set; receiving a connection request message that is sent on a selected connection request resource by one UE in the user equipment set; acquiring a first information segment of a radio resource control connection request of the UE according to the selected connection request resource and the mapping relationship; receiving a radio resource control connection request message that is sent, by the UE, on a radio resource that corresponds to the resource scheduling information; and determining radio resource control connection request information of the UE according to the first information segment of the radio resource control connection request and a second information segment of the radio resource control connection request.

9 Claims, 9 Drawing Sheets

(51) Int. Cl.
*H04W 56/00* (2009.01)
*H04W 72/12* (2009.01)
*H04W 76/04* (2009.01)
H04W 72/02 (2009.01)
H04W 72/04 (2009.01)
H04W 4/20 (2009.01)

(52) U.S. Cl.
CPC ....... *H04W 28/0289* (2013.01); *H04W 28/06* (2013.01); *H04W 56/001* (2013.01); *H04W 72/1257* (2013.01); *H04W 76/00* (2013.01); *H04W 76/046* (2013.01); *H04W 4/20* (2013.01); *H04W 72/02* (2013.01); *H04W 72/0413* (2013.01)

(56) References Cited

U.S. PATENT DOCUMENTS

2009/0116434 A1 5/2009 Lohr et al.
2011/0261681 A1 10/2011 Wu
2011/0292893 A1 12/2011 Lee et al.
2012/0269122 A1 10/2012 Lee
2015/0103790 A1 4/2015 Lee et al.

FOREIGN PATENT DOCUMENTS

| | | |
|---|---|---|
| CN | 101472341 A | 7/2009 |
| CN | 101669393 A | 3/2010 |
| CN | 101741670 A | 6/2010 |
| CN | 101742591 A | 6/2010 |
| CN | 101742670 A | 6/2010 |
| CN | 102202414 A | 9/2011 |
| WO | 2012/044211 A1 | 4/2012 |

OTHER PUBLICATIONS

Extended European Search Report dated May 6, 2016 in corresponding European Patent Application No. 13887632.1.
Chinese Office Action dated Jan. 17, 2017 in corresponding Chinese Patent Application No. 201380002296.4.
International Search Report dated Apr. 3, 2014, in corresponding International Application No. PCT/CN2013/078013.

CONNECTION SETUP METHOD, APPARATUS, AND SYSTEM

CROSS-REFERENCE TO RELATED APPLICATIONS

This application is a continuation of International Application No. PCT/CN2013/078013, filed on Jun. 26, 2013, which is hereby incorporated by reference in its entirety.

TECHNICAL FIELD

Embodiments of the present invention relate to wireless communications technologies, and in particular, to a connection setup method, apparatus, and system.

BACKGROUND

Radio resource control (RRC) connection setup in a Long Term Evolution (LTE) system is a basic premise for user equipment (UE) and a network to establish signaling, and is a crucial part to ensure establishment of communication. Design of an efficient RRC connection setup method is significant to system performance.

An RRC connection setup process in LTE is a process in which when UE is in an idle mode, if the UE requests to establish a signaling connection, the UE sends an RRC connection request message to an evolved base station (eNB), to trigger RRC connection setup, where the RRC connection request message has a fixed length, and needs to carry at least an identifier of the UE, a connection setup reason, and other information.

At present, with the rapid development of Machine-to-Machine (M2M) devices, a quantity, types, and network access reasons of UEs increase, so that setup of RRC connections for a large quantity of UEs cannot be supported due to a limited length of information carried in an RRC connection request, causing congestion and delays during communication of the UEs.

SUMMARY

Embodiments of the present invention provide a connection setup method, apparatus, and system, so as to resolve the problem that, when UEs originate RRC connection setup, setup of RRC connections for a large quantity of UEs cannot be supported.

According to a first aspect, an embodiment of the present invention provides a connection setup method, including:

sending information about to-be-provided connection request resources to a user equipment UE set;

receiving a connection request message that is sent on a selected connection request resource by one UE in the user equipment set, where based on a set algorithm, a mapping relationship exists between the selected connection request resource and a first information segment of a radio resource control connection request of the UE;

acquiring the first information segment of the radio resource control connection request of the UE according to the selected connection request resource and the mapping relationship;

sending, to the UE, resource scheduling information that is generated according to a scheduling policy and used for the UE to send a radio resource control connection request message;

receiving the radio resource control connection request message that is sent, by the UE, on a radio resource that corresponds to the resource scheduling information, where the radio resource control connection request message carries a second information segment of the radio resource control connection request of the UE; and determining radio resource control connection request information of the UE according to the first information segment of the radio resource control connection request and the second information segment of the radio resource control connection request.

In a first possible implementation manner of the first aspect, the connection request resource is a common scheduling request resource or a random access resource.

According to the first possible implementation manner of the first aspect, in a second possible implementation manner of the first aspect, if the connection request resource is a common scheduling request resource, before the sending information about to-be-provided connection request resources to a user equipment UE set, the method further includes:

assigning uplink time synchronization information to the UE, so that the UE achieves uplink time synchronization before sending the radio resource control connection request message.

According to the first possible implementation manner of the first aspect, in a third possible implementation manner of the first aspect, if the connection request resource is a random access resource, the resource scheduling information includes:

uplink time synchronization information assigned to the UE, so that the UE achieves uplink time synchronization before sending the radio resource control connection request message.

In a fourth possible implementation manner of the first aspect, the acquiring the first information segment of the radio resource control connection request of the UE according to the selected connection request resource and the mapping relationship includes:

converting, based on the mapping relationship, an identifier of the selected connection request resource to at least one of an identifier of the UE, a connection reason, a device type, a connection service type, and a destination node address.

In a fifth possible implementation manner of the first aspect, before the sending, to the UE, resource scheduling information that is generated according to a scheduling policy and used for the UE to send a radio resource control connection request message, the method further includes:

generating a radio network temporary identifier of the selected connection request resource according to a time-frequency position of the selected connection request resource, and using the radio network temporary identifier to identify the resource scheduling information of the radio resource control connection request message.

According to a second aspect, an embodiment of the present invention provides a connection setup method, including:

receiving information about to-be-provided connection request resources that is sent by a base station;

acquiring the to-be-provided connection request resources of the base station according to the information about the to-be-provided connection request resources, and establishing, based on a set algorithm, a mapping relationship between a first information segment of a radio resource control connection request of one user equipment UE and at least one to-be-provided connection request resource;

using the to-be-provided connection request resource for which the mapping relationship is established as a selected connection request resource, and sending, on the selected connection request resource, request connection information to the base station;

receiving resource scheduling information that is sent by the base station, generated according to a scheduling policy, and used for the UE to send a radio resource control connection request message; and sending, on a radio resource that corresponds to the resource scheduling information, the radio resource control connection request message according to the resource scheduling information, where the radio resource control connection request message carries a second information segment of the radio resource control connection request of the user equipment UE.

In a first possible implementation manner of the second aspect, the connection request resource is a common scheduling request resource or a random access resource.

According to the first possible implementation manner of the second aspect, in a second possible implementation manner of the second aspect, if the connection request resource is a common scheduling request resource, before the receiving information about to-be-provided connection request resources that is sent by a base station, the method further includes:

acquiring uplink time synchronization information, so that the UE achieves uplink time synchronization before sending the radio resource control connection request message.

According to the first possible implementation manner of the second aspect, in a third possible implementation manner of the second aspect, if the connection request resource is a random access resource, the resource scheduling information includes:

uplink time synchronization information assigned by the base station, so that uplink time synchronization is achieved before the radio resource control connection request message is sent.

In a fourth possible implementation manner of the second aspect, the acquiring the to-be-provided connection request resources of the base station according to the information about the to-be-provided connection request resources, and establishing, based on a set algorithm, a mapping relationship between a first information segment of a radio resource control connection request of one user equipment UE and at least one to-be-provided connection request resource includes:

converting, based on the set algorithm, at least one of an identifier of the UE, a connection reason, a device type, a connection service type, and a destination node address into an identifier of the connection request resource; and establishing a mapping relationship with the connection request resource that matches the identifier obtained through conversion.

In a fifth possible implementation manner of the second aspect, before the using the to-be-provided connection request resource for which the mapping relationship is established as a selected connection request resource, and sending, on the selected connection request resource, request connection information to the base station, the method further includes: generating a radio network temporary identifier of the selected connection request resource according to a time-frequency position acquired from the selected connection request resource and storing the radio network temporary identifier locally; and correspondingly, before the sending, on the radio resource, the radio resource control connection request message according to the request resource scheduling information, the method further includes: acquiring a radio network temporary identifier from the received resource scheduling information, performing matching between the radio network temporary identifier and the local radio network temporary identifier, and when the matching succeeds, sending, on the resource, the radio resource control connection request message according to the scheduling information.

According to a third aspect, an embodiment of the present invention provides a connection setup apparatus, including:

a sending module, configured to send information about to-be-provided connection request resources to a user equipment UE set;

a receiving module, configured to receive a connection request message that is sent on a selected connection request resource by one UE in the user equipment set, where the selected connection request resource is selected, by the UE, from the to-be-provided connection request resources sent by the sending module, and based on a set algorithm, a mapping relationship exists between the selected connection request resource and a first information segment of a radio resource control connection request of the UE;

an acquiring module, configured to acquire the first information segment of the radio resource control connection request of the UE according to the selected connection request resource received by the receiving module and the mapping relationship;

a scheduling module, configured to generate, according to a scheduling policy, resource scheduling information that is used for the UE to send a radio resource control connection request message, where the sending module is configured to send the resource scheduling information generated by the scheduling module, and the receiving module is configured to receive the radio resource control connection request message that is sent, by the UE, on a radio resource that corresponds to the resource scheduling information, where the radio resource control connection request message carries a second information segment of the radio resource control connection request of the UE; and a determining module, configured to determine radio resource control connection request information of the UE according to the first information segment of the radio resource control connection request of the UE that is acquired by the acquiring module and the second information segment, which is received by the receiving module, of the radio resource control connection request of the UE.

In a first possible implementation manner of the third aspect, the connection request resource sent by the sending module is a common scheduling request resource or a random access resource.

According to the first possible implementation manner of the third aspect, in a second possible implementation manner of the third aspect, the apparatus further includes:

an assigning module, configured to: before the sending module sends to-be-provided common scheduling request resources to the user equipment UE set, assign uplink time synchronization information to the UE, so that the UE achieves uplink time synchronization before sending the radio resource control connection request information.

According to the first possible implementation manner of the third aspect, in a third possible implementation manner of the third aspect, the scheduling module is configured to: when the connection request resource sent by the sending module is a random access resource, generate resource scheduling information that includes uplink time synchronization information for the UE and assign the resource scheduling information to the UE, so that the UE achieves uplink time synchronization before sending the radio resource control connection request message.

In a fourth possible implementation manner of the third aspect, the acquiring module is specifically configured to:

map, based on the mapping relationship, an identifier of the selected connection request resource to at least one of an identifier of the user equipment, a connection reason, a device type, a connection service type, and a destination node address.

In a fifth possible implementation manner of the third aspect, the apparatus further includes: an identifying module, configured to: before the sending module sends the resource scheduling information generated by the scheduling module, generate a radio network temporary identifier of the selected connection request resource according to a time-frequency position of the selected connection request resource, and use the radio network temporary identifier to identify the resource scheduling information of the radio resource control connection request message.

According to a fourth aspect, an embodiment of the present invention provides a connection setup apparatus, including:

a receiving module, configured to receive information about to-be-provided connection request resources that is sent by a base station;

a mapping module, configured to acquire the to-be-provided connection request resources of the base station according to the information about the to-be-provided connection request resources that is received by the receiving module, and establish, based on a set algorithm, a mapping relationship between a first information segment of a radio resource control connection request of one user equipment UE and at least one to-be-provided connection request resource;

a selection module, configured to use the to-be-provided connection request resource for which the mapping module establishes the mapping relationship as a selected connection request resource; and a sending module, configured to send, on the connection request resource selected by the selection module, request connection information to the base station, where the receiving module is configured to receive resource scheduling information that is sent by the base station, generated according to a scheduling policy, and used for the UE to send a radio resource control connection request message; and the sending module is configured to send, on a radio resource that corresponds to the resource scheduling information, the radio resource control connection request message according to the resource scheduling information, where the radio resource control connection request message carries a second information segment of the radio resource control connection request of the UE.

In a first possible implementation manner of the fourth aspect, the connection request resource received by the receiving module is a common scheduling request resource or a random access resource.

According to the first possible implementation manner of the fourth aspect, in a second possible implementation manner of the fourth aspect, the apparatus further includes: an acquiring module, configured to: before the receiving module receives to-be-provided common scheduling request resources, acquire uplink time synchronization information, so that the UE achieves uplink time synchronization before sending the radio resource control connection request message.

According to the first possible implementation manner of the fourth aspect, in a third possible implementation manner of the fourth aspect, the apparatus further includes:

the receiving module being configured to: when the received connection request resource is a random access resource, receive resource scheduling information that includes uplink time synchronization information assigned by the base station, so that uplink time synchronization is achieved before the radio resource control connection request message is sent.

In a fourth possible implementation manner of the fourth aspect, the mapping module is specifically configured to:

map, based on the set algorithm, at least one of an identifier of the UE, a connection reason, a device type, a connection service type, and a destination node address into an identifier of the connection request resource; and establish a mapping relationship with the connection request resource that matches the identifier obtained through conversion.

In a fifth possible implementation manner of the fourth aspect, the apparatus further includes: an identifying module, configured to: before the sending module uses the to-be-provided connection request resource for which the mapping relationship is established as the selected connection request resource, and sends, on the selected connection request resource, the request connection information to the base station, generate a radio network temporary identifier of the selected connection request resource according to a time-frequency position acquired from the selected connection request resource and store the radio network temporary identifier locally; and correspondingly, the apparatus further includes: a matching module, configured to: before the sending module sends, on the radio resource, the radio resource control connection request message according to the request resource scheduling information, acquire a radio network temporary identifier from the resource scheduling information received by the receiving module, perform matching between the radio network temporary identifier and the local radio network temporary identifier, and when the matching succeeds, send, on the resource, the radio resource control connection request message according to the scheduling information.

According to a fifth aspect, an embodiment of the present invention provides a connection setup apparatus, including:

a transmitter, configured to send information about to-be-provided connection request resources to a user equipment UE set;

a receiver, configured to receive a connection request message that is sent on a selected connection request resource by one UE in the user equipment set, where the selected connection request resource is selected, by the UE, from the to-be-provided connection request resources sent by the transmitter, and based on a set algorithm, a mapping relationship exists between the selected connection request resource and a first information segment of a radio resource control connection request of the UE; and a processor, configured to acquire the first information segment of the radio resource control connection request of the UE according to the selected connection request resource and the mapping relationship, where the processor is configured to generate, according to a scheduling policy, resource scheduling information that is used for the UE to send a radio resource control connection request message;

the transmitter is configured to send the resource scheduling information generated by the processor;

the receiver is configured to receive the radio resource control connection request message that is sent, by the UE, on a radio resource that corresponds to the resource scheduling information, where the radio resource control connection request message carries a second information segment of the radio resource control connection request of the UE; and the processor is configured to determine radio resource control connection request information of the UE according to the first information segment of the radio resource control connection request and the second information segment, which is received by the receiver, of the radio resource control connection request.

In a first possible implementation manner of the fifth aspect, the connection request resource sent by the transmitter is a common scheduling request resource or a random access resource.

According to the first possible implementation manner of the fifth aspect, in a second possible implementation manner of the fifth aspect, the processor is further configured to:

before the transmitter sends to-be-provided common scheduling request resources to the user equipment UE set, assign uplink time synchronization information to the UE, so that the UE achieves uplink time synchronization before sending the radio resource control connection request information.

According to the first possible implementation manner of the fifth aspect, in a third possible implementation manner of the fifth aspect, the processor is specifically configured to: when the connection request resource sent by the transmitter is a random access resource, generate resource scheduling information that includes uplink time synchronization information for the UE and assign the resource scheduling information to the UE, so that the UE achieves uplink time synchronization before sending the radio resource control connection request message.

In a fourth possible implementation manner of the fifth aspect, the processor is specifically configured to:

convert, based on the mapping relationship, an identifier of the selected connection request resource to at least one of an identifier of the UE, a connection reason, a device type, a connection service type, and a destination node address.

In a fifth possible implementation manner of the fifth aspect, the processor is further configured to: before the transmitter sends the generated resource scheduling information, generate a radio network temporary identifier of the selected connection request resource according to a time-frequency position of the selected connection request resource, and use the radio network temporary identifier to identify the resource scheduling information of the radio resource control connection request message.

According to a sixth aspect, an embodiment of the present invention provides a connection setup apparatus, including: a receiver, configured to receive information about to-be-provided connection request resources that is sent by a base station;

a processor, configured to acquire the to-be-provided connection request resources of the base station according to the information about the to-be-provided connection request resources that is received by the receiver, and establish, based on a set algorithm, a mapping relationship between a first information segment of a radio resource control connection request of one user equipment UE and at least one to-be-provided connection request resource, where the processor is configured to use the to-be-provided connection request resource for which the mapping relationship is established as a selected connection request resource; and a transmitter, configured to send, on the connection request resource selected by the processor, request connection information to the base station, where the receiver is configured to receive resource scheduling information that is sent by the base station, generated according to a scheduling policy, and used for the UE to send a radio resource control connection request message; and the transmitter is configured to send, on a radio resource that corresponds to the resource scheduling information, the radio resource control connection request message according to the resource scheduling information, where the radio resource control connection request message carries a second information segment of the radio resource control connection request of the UE.

In a first possible implementation manner of the sixth aspect, the connection request resource received by the receiver is a common scheduling request resource or a random access resource.

According to the first possible implementation manner of the sixth aspect, in a second possible implementation manner of the sixth aspect, the processor is further configured to: before the receiver receives to-be-provided common scheduling request resources, acquire uplink time synchronization information, so that the UE achieves uplink time synchronization before sending the radio resource control connection request message.

According to the first possible implementation manner of the sixth aspect, in a third possible implementation manner of the sixth aspect, the receiver is configured to: when the received connection request resource is a random access resource, receive resource scheduling information that includes uplink time synchronization information assigned by the base station, so that uplink time synchronization is achieved before the radio resource control connection request message is sent.

In a fourth possible implementation manner of the sixth aspect, the processor is specifically configured to:

convert, based on the set algorithm, at least one of an identifier of the UE, a connection reason, a device type, a connection service type, and a destination node address into an identifier of the connection request resource; and establish a mapping relationship with the connection request resource that matches the identifier obtained through conversion.

In a fifth possible implementation manner of the sixth aspect, the processor is further configured to: before the transmitter uses the to-be-provided connection request resource for which the mapping relationship is established as the selected connection request resource, and sends, on the selected connection request resource, the request connection information to the base station, generate a radio network temporary identifier of the selected connection request resource according to a time-frequency position acquired from the selected connection request resource and store the radio network temporary identifier locally; and is configured to: before the transmitter sends, on the radio resource, the radio resource control connection request message according to the request resource scheduling information, acquire a radio network temporary identifier from the resource scheduling information received by the receiver, perform matching between the radio network temporary identifier and the local radio network temporary identifier, and when the matching succeeds, send, on the resource, the radio resource control connection request message according to the scheduling information.

According to a seventh aspect, an embodiment of the present invention provides a connection setup system, including: the connection setup apparatus according to any one of the fifth aspect and the first implementation manner to the fifth possible implementation manner of the fifth aspect; and the connection setup apparatus according to any one of the sixth aspect and the first implementation manner to the fifth possible implementation manner of the sixth aspect.

In the present invention, a mapping relationship is established between a part of RRC connection request information of user equipment and a connection request resource, so that the user equipment implicitly sends the part of RRC request information before originating an RRC connection request. When the RRC connection request is originated, only remaining RRC request information needs to be sent, so that a quantity of information carried in the RRC request is reduced, and a current RRC request message is extended so as to accommodate the access of more types of users and notify a network, so that the network selects to use different optimization solutions to resolve the problem that setup of RRC connections for a large quantity of user terminals cannot be supported because of a limited length of information carried in an RRC connection request, causing congestion and delays during communication of the user terminals.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
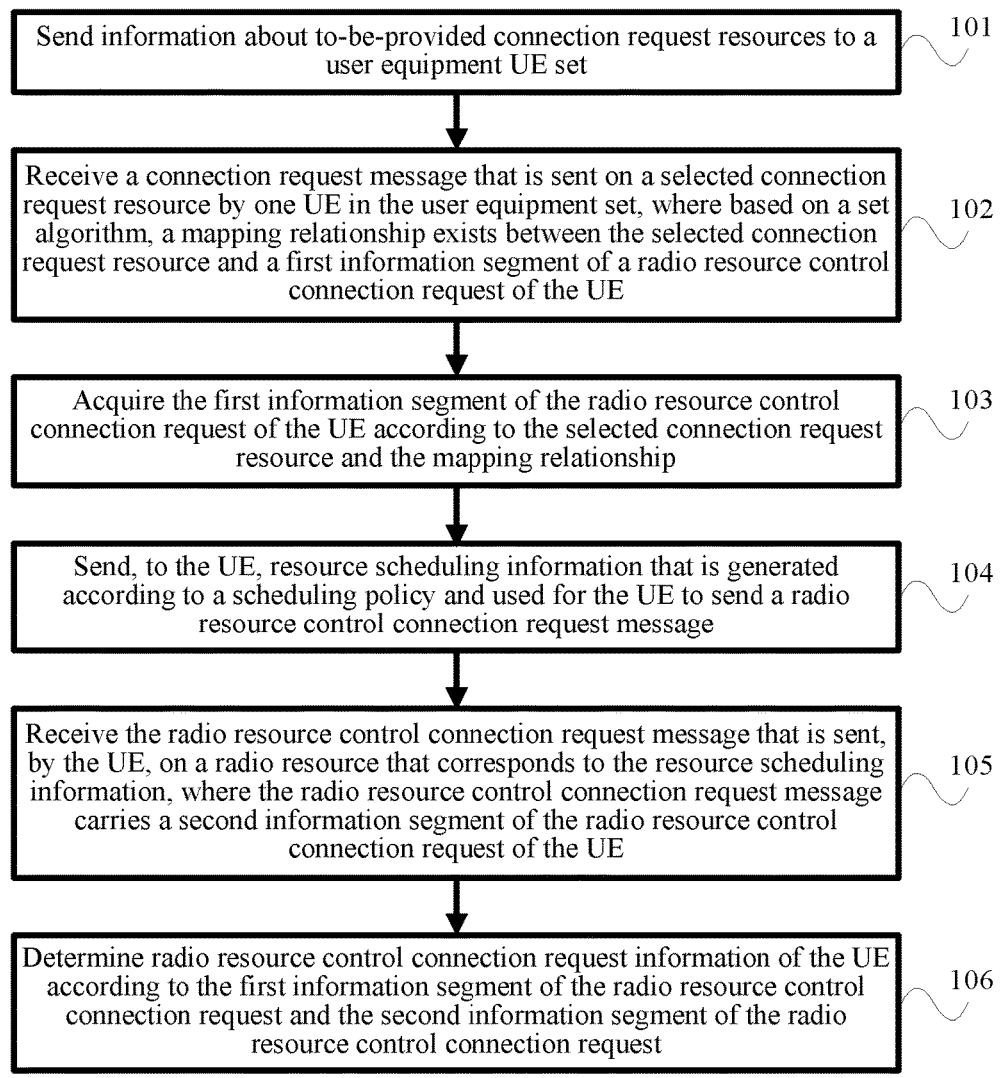
FIG. 1 is a flowchart of an embodiment of a connection setup method according to the present invention.

FIG. 1 is a flowchart of an embodiment of a connection setup method according to the present invention. The method in this embodiment is performed by a connection setup apparatus, where the apparatus may be implemented in a form of hardware or software, and may be configured in an eNB. As shown in FIG. 1, the method includes the following steps:

Step 101: Send information about to-be-provided connection request resources to a user equipment UE set.

The user equipment UE set includes at least one user equipment. An eNB may broadcast and send the information about the to-be-provided connection request resources to UEs within network coverage of the eNB, for a UE that needs to establish an RRC connection to acquire, according to the received information about the to-be-provided connection request resources, a connection request resource that the eNB can provide.

Step 102: Receive a connection request message that is sent on a selected connection request resource by one UE in the user equipment set, where based on a set algorithm, a mapping relationship exists between the selected connection request resource and a first information segment of a radio resource control connection request of the UE.

In this step, the UE that is to establish an RRC connection may perform an operation of selecting a connection request resource. The UE establishes, based on the set algorithm, the mapping relationship between the selected connection request resource and the first information segment of the radio resource control connection request of the UE. There are multiple implementation manners for the set algorithm and the mapping relationship, as long as there is a determined correspondence between the selected connection request resource and an information segment of the UE. The information segment of the UE is generally information of the UE that the eNB needs to know, typically, such as an identifier of the UE and a connection setup reason, and may be also extended into information such as a device type, a connection service type, and a destination node address.

Step 103: Acquire the first information segment of the radio resource control connection request of the UE according to the selected connection request resource and the mapping relationship.

The eNB is also configured with a set algorithm the same as that of the UE; therefore, when receiving connection request resource selection information that is sent on the selected connection request resource by the UE, the eNB obtains the mapping relationship between the first information segment of the radio resource control connection request of the UE and the selected connection request resource according to the set algorithm, and acquires the first information segment of the radio resource control connection request of the UE according to the mapping relationship.

Step 104: Send, to the UE, resource scheduling information that is generated according to a scheduling policy and used for the UE to send a radio resource control connection request message.

When the eNB receives selected connection request resources sent by multiple UEs, the eNB sends, on the connection request resource selected by each UE, connection request resource scheduling information to each UE according to the scheduling policy, to uniformly schedule the UEs in a cell. The scheduling policy may be a time-based sorting or priority-based sorting manner, or the like.

Step 105: Receive the radio resource control connection request message that is sent, by the UE, on a radio resource that corresponds to the resource scheduling information, where the radio resource control connection request message carries a second information segment of the radio resource control connection request of the UE.

In this step, after the UE receives the connection request resource scheduling information of the eNB, the UE sends an RRC request to the eNB on a radio resource that belongs to the UE, that is, on the selected connection request resource, to establish a signaling connection.

In this step, preferably, the second information segment of the radio resource control connection request does not completely overlap content of the first information segment of the radio resource control connection request; in this way, the UE can send an information segment of the UE twice. Preferably, the second information segment of the radio resource control connection request is remaining radio resource control connection request information other than the first information segment of the radio resource control connection request in the entire radio resource control connection request information. Therefore, when sending the radio resource control connection request, the user equipment does not need to send the entire radio resource control connection request information, but needs to send only the remaining radio resource control connection request information other than the first information segment of the radio resource control connection request in step 103.

Step 106: Determine radio resource control connection request information of the UE according to the first information segment of the radio resource control connection request and the second information segment of the radio resource control connection request.

In this step, the eNB can obtain the entire radio resource control connection request information of the user equipment according to the first information segment of the radio resource control connection request that is acquired in step 103 and the second information segment, which is acquired in step 105, of the radio resource control connection request. The eNB may process an RRC connection request according to the entire acquired radio resource control connection request information of the user equipment. At this point, an RRC connection setup process between the eNB and the user equipment is completed.

Relative to a situation in which, in a current LTE system, a length of an RRC connection request (RRC Connection Request) message is limited, and only 2-bit remaining space is available currently and is difficult to be further extended, in this embodiment, an eNB establishes a mapping relationship between a part of RRC connection request information of user equipment and a connection request resource, so that the user equipment already implicitly sends the part of RRC request information before originating an RRC connection request. When the RRC connection request is originated, only remaining RRC request information needs to be sent, so that a quantity of information carried in an RRC request is reduced. A field of the reduced RRC request information is extended, for example, extended to identify a device type, so as to accommodate the access of more types of users and notify a network, so that the network selects to use different optimization solutions to resolve the problem that setup of RRC connections for a large quantity of user terminals cannot be supported because of a limited length of information carried in an RRC connection request, causing congestion and delays during communication of the user terminals.

Figure 2:
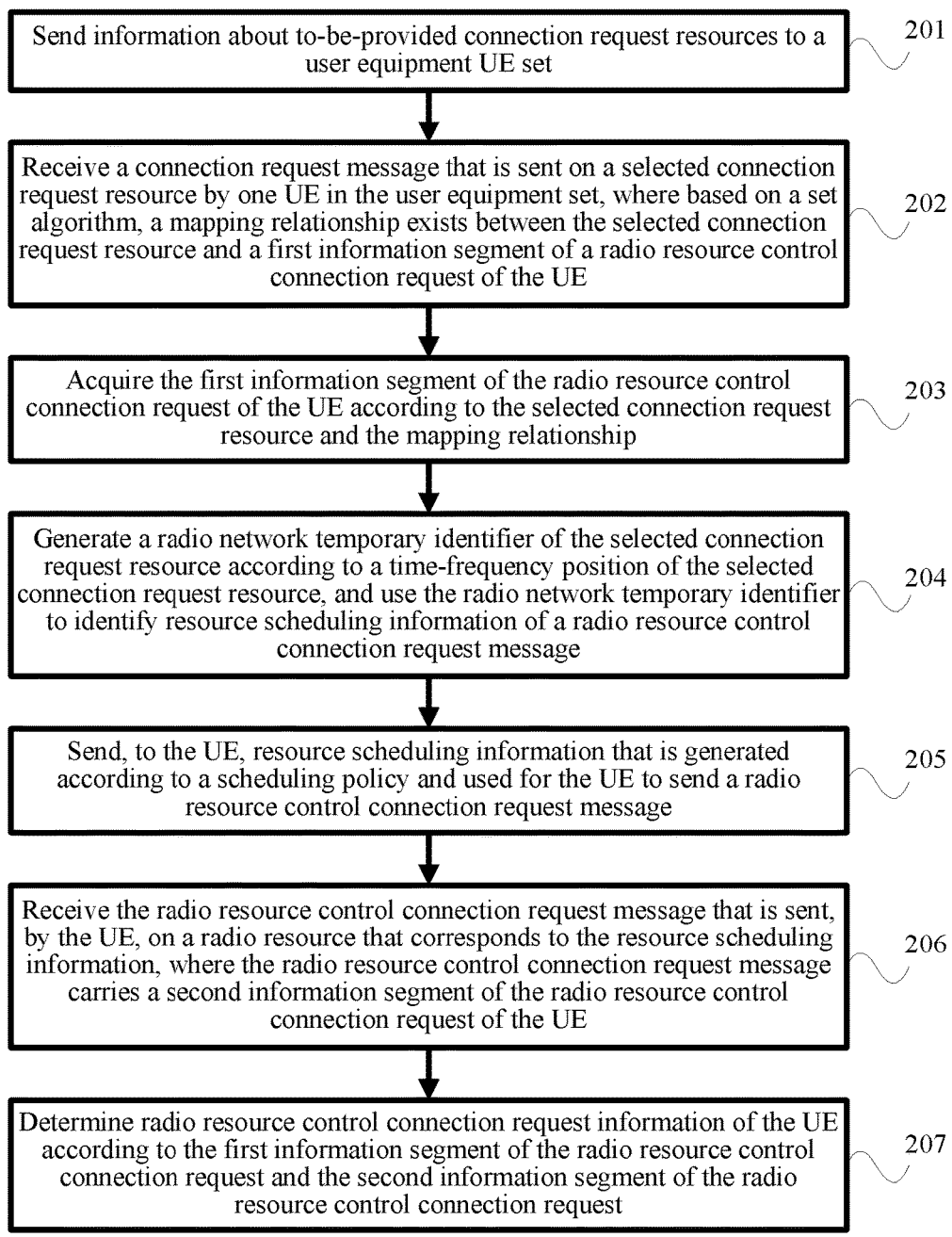
FIG. 2 is a flowchart of another embodiment of a connection setup method according to the present invention.

FIG. 2 is a flowchart of another embodiment of a connection setup method according to the present invention. Based on the foregoing embodiment, a step of generating a radio network temporary identifier of the selected connection request resource is added in this embodiment. As shown in FIG. 2, the method specifically includes the following steps:

Step 201: Send information about to-be-provided connection request resources to a user equipment UE set.

In this step, a to-be-provided connection request resource is a resource that an eNB can provide for use of a UE when the UE requests to establish a connection. For example, the to-be-provided connection request resource may be: a physical random access channel (Physical Random Access Channel, PRACH for short) resource and a preamble sequence (Preamble) sent on the PRACH resource, or a common scheduling request (Scheduling Request, SR for short) resource.

In this step, broadcast information may also be sent to each user equipment after the to-be-provided connection request resources are grouped and each group of to-be-provided connection request resources are identified, where the broadcast information carries an identifier of the to-be-provided connection request resource.

Optionally, if the to-be-provided connection request resource is an SR resource, before this step, the method may further include: assigning uplink time synchronization information to the UE, so that the UE achieves uplink time synchronization before sending a radio resource control connection request message.

Two solutions may be used to receive an initial access request of the UE to enable the UE to acquire uplink time synchronization of initial access: one solution is to use a normal Preamble; and the other solution is specific to a cell with a very small radius, which means that a length of a current cyclic prefix (cyclic prefix, CP for short) can overcome a problem brought by uplink out-of-synchronization, and because the CP is already capable of handling impact caused by a transmission delay, the Preamble does not need to be used for initial access.

Step 202: Receive a connection request message that is sent on a selected connection request resource by one UE in the user equipment set, where based on a set algorithm, a mapping relationship exists between the selected connection request resource and a first information segment of a radio resource control connection request of the UE.

In this step, a preferred implementation manner of the first information segment of the radio resource control connection request of the user equipment may include at least one of an identifier of the user equipment, a connection setup reason, a device type, a connection service type, and a destination node address.

The identifier, which participates in mapping, of the user equipment may be an entire identifier of the user equipment, or may be a partial identifier of the user equipment, for example, the identifier of the user equipment is 40 bits, only 7 bits of the 40 bits may be mapped, or all the 40 bits may be mapped. A length of the identifier, which participates in mapping, of the user equipment is mainly determined according to a length of an identifier of the connection request resource and the set algorithm.

The connection setup reason may include: emergency (emergency), high priority access (high Priority Access), mobile terminated access (mt-Access), mobile originated signaling (mo-Signaling), mobile originated data (mo-Data), delay tolerant access (delay Tolerant Access), and the like.

A type of the user equipment may include a low cost terminal, a high-capability terminal, and the like.

A calculation method of the set algorithm may be implemented by mapping an identifier of a UE, for example, an S-TMSI, to an SR resource, and may be similar to a calculation manner of a page replacement algorithm (Paging).

Step 203: Acquire the first information segment of the radio resource control connection request of the UE according to the selected connection request resource and the mapping relationship.

The eNB calculates the first information segment of the radio resource control connection request of the UE according to the mapping relationship and an identifier of the selected connection request resource, where a preferred implementation manner is: converting, based on the mapping relationship, the identifier of the selected connection request resource to at least one of the identifier of the UE, a connection reason, the device type, the connection service type, and the destination node address.

The identifier of the user equipment and the connection reason are fields in RRC connection request information in the prior art, and the device type, the connection service type, the destination node address, and the like are extensible mapping fields.

Step 204: Generate a radio network temporary identifier of the selected connection request resource according to a time-frequency position of the selected connection request resource, and use the radio network temporary identifier to identify resource scheduling information of a radio resource control connection request message.

The radio network temporary identifier of the selected connection request resource is used for the UE and the eNB to authenticate and identify a unique connection request resource in a current cell. For example, when the connection request resource is an SR, the radio network temporary identifier of the connection request resource may be defined as SR-RNTI. A corresponding SR-RNTI is calculated according to a time-frequency position of the SR, and is used for authenticating received information subsequently sent by a network side.

Step 205: Send, to the user equipment, resource scheduling information that is generated according to a scheduling policy and used for the user equipment to send a radio resource control connection request message.

Optionally, in this step, if the connection request resource is a random access resource, the resource scheduling information includes: uplink time synchronization information assigned to the UE, so that the UE achieves uplink time synchronization before sending the radio resource control connection request message. That is, the resource scheduling information may not only include common information used for the UE to perform scheduling, but also preferably includes the uplink time synchronization information assigned to the UE.

The scheduling policy includes the scheduling policy described in the previous embodiment, and details are not described herein again.

Step 206: Receive the radio resource control connection request message that is sent, by the UE, on a radio resource that corresponds to the resource scheduling information, where the radio resource control connection request message carries a second information segment of the radio resource control connection request of the UE.

In this step, the second information segment of the radio resource control connection request includes the second information segment of the radio resource control connection request described in the previous embodiment, and details are not described herein again.

Step 207: Determine radio resource control connection request information of the UE according to the first information segment of the radio resource control connection request and the second information segment of the radio resource control connection request.

In the foregoing solution, the radio network temporary identifier of the selected connection request resource may be generated according to a time-frequency position acquired from each selected connection request resource, thereby avoiding a problem brought by collision when there are many connection request resources.

Based on the technical solution of any one of the embodiments described above, preferably, the connection request resource is an SR resource. Because there are more SR resources than PRACH resources in the prior art, there is also more RRC connection request information that can be implicitly sent, so that more resources are saved, and access of more user equipments can be supported.

Figure 3:
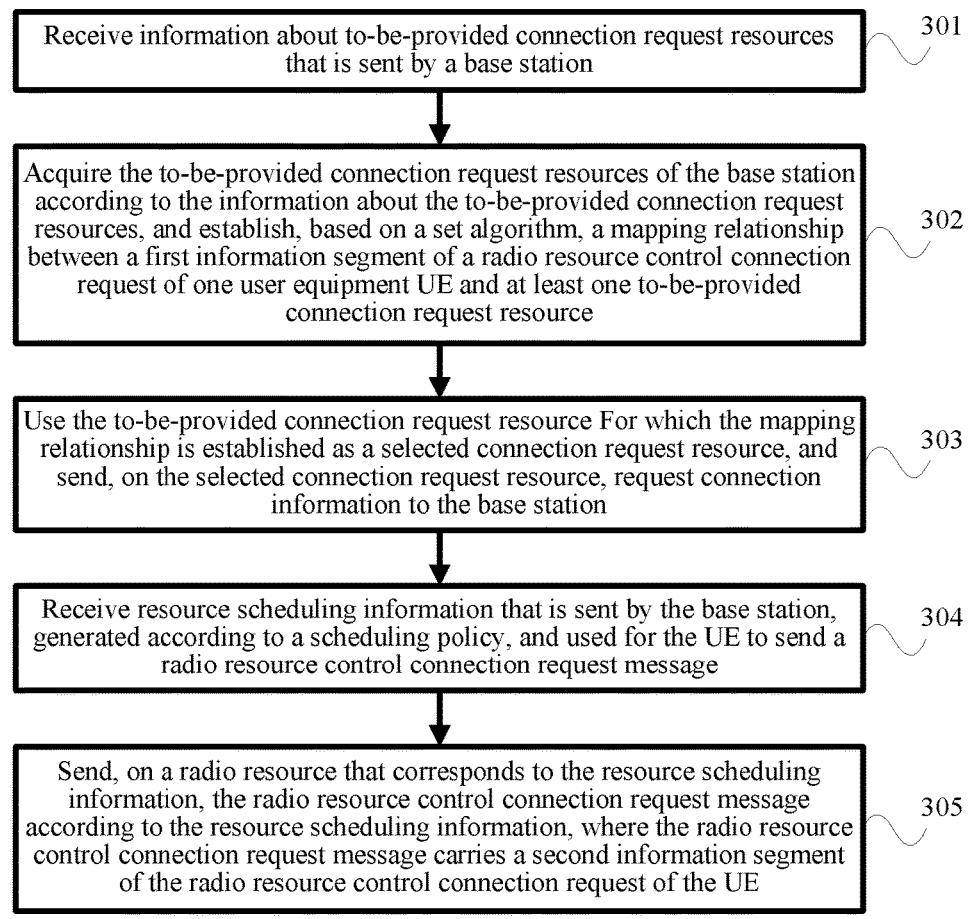
FIG. 3 is a flowchart of still another embodiment of a connection setup method according to the present invention.

FIG. 3 is a flowchart of still another embodiment of a connection setup method according to the present invention. The method in this embodiment is performed by another connection setup apparatus, where the apparatus may be implemented in a form of hardware or software, and may be configured in a UE. As shown in FIG. 3, the method includes following steps:

Step 301: Receive information about to-be-provided connection request resources that is sent by a base station.

An eNB may broadcast and send the information about the to-be-provided connection request resources to a user equipment UE set within network coverage of the eNB, for one UE that needs to establish an RRC connection to acquire, according to the received information about the to-be-provided connection request resources, a connection request resource that the eNB can provide.

Step 302: Acquire the to-be-provided connection request resources of the base station according to the information about the to-be-provided connection request resources, and establish, based on a set algorithm, a mapping relationship between a first information segment of a radio resource control connection request of one user equipment UE and at least one to-be-provided connection request resource.

In this step, the UE selects, from the to-be-provided connection request resources, the at least one connection request resource according to the set algorithm, and establishes the mapping relationship between the first information segment of the radio resource control connection request of the UE and the selected connection request resource. There are multiple implementation manners for the set algorithm and the mapping relationship, as long as there is a determined correspondence between the selected connection request resource and an information segment of the UE. Content of the information segment of UE includes the information segment described in any one of the foregoing embodiments, and details are not described herein again.

In this step, a preferred implementation manner may be: converting, based on the set algorithm, at least one of an identifier of the UE, a connection reason, a device type, a connection service type, and a destination node address into an identifier of the connection request resource; and establishing a mapping relationship with the connection request resource that matches the identifier obtained through conversion.

Step 303: Use the to-be-provided connection request resource for which the mapping relationship is established as a selected connection request resource, and send, on the selected connection request resource, request connection information to the base station.

In this step, the UE uses the to-be-provided connection request resource that participates in mapping of the first information segment of the radio resource control connection request of the UE as the selected connection request resource, and sends, on the selected connection request resource, a selected result as a notification message to the eNB.

Step 304: Receive resource scheduling information that is sent by the base station, generated according to a scheduling policy, and used for the UE to send a radio resource control connection request message.

In this step, the eNB receives the selected connection request resource sent from UE, and schedules the connection request resource for the UE according to the scheduling policy.

Step 305: Send, on a radio resource that corresponds to the resource scheduling information, the radio resource control connection request message according to the resource scheduling information, where the radio resource control connection request message carries a second information segment of the radio resource control connection request of the UE.

Because the first information segment of the radio resource control connection request is already mapped to the selected connection request resource in step 302, in this step, when sending an RRC connection request, the UE needs to add only remaining radio resource control connection request information other than the first information segment of the radio resource control connection request to radio resource control connection request information, that is, the second information segment of the radio resource control connection request.

In this embodiment, a UE establishes a mapping relationship between radio resource control connection request information and a connection request resource, so that the UE already implicitly sends a part of radio resource control connection request information before originating an RRC connection request. When the RRC connection request is originated, only remaining radio resource control connection request information needs to be sent, so that a quantity of information carried in a radio resource control connection request is reduced; and an RRC connection request message is extended, so as to resolve the problem that setup of RRC connections for a large quantity of user terminals cannot be supported because of a limited length of information carried in an RRC connection request, causing congestion and delays during communication of the user terminals.

Figure 4:
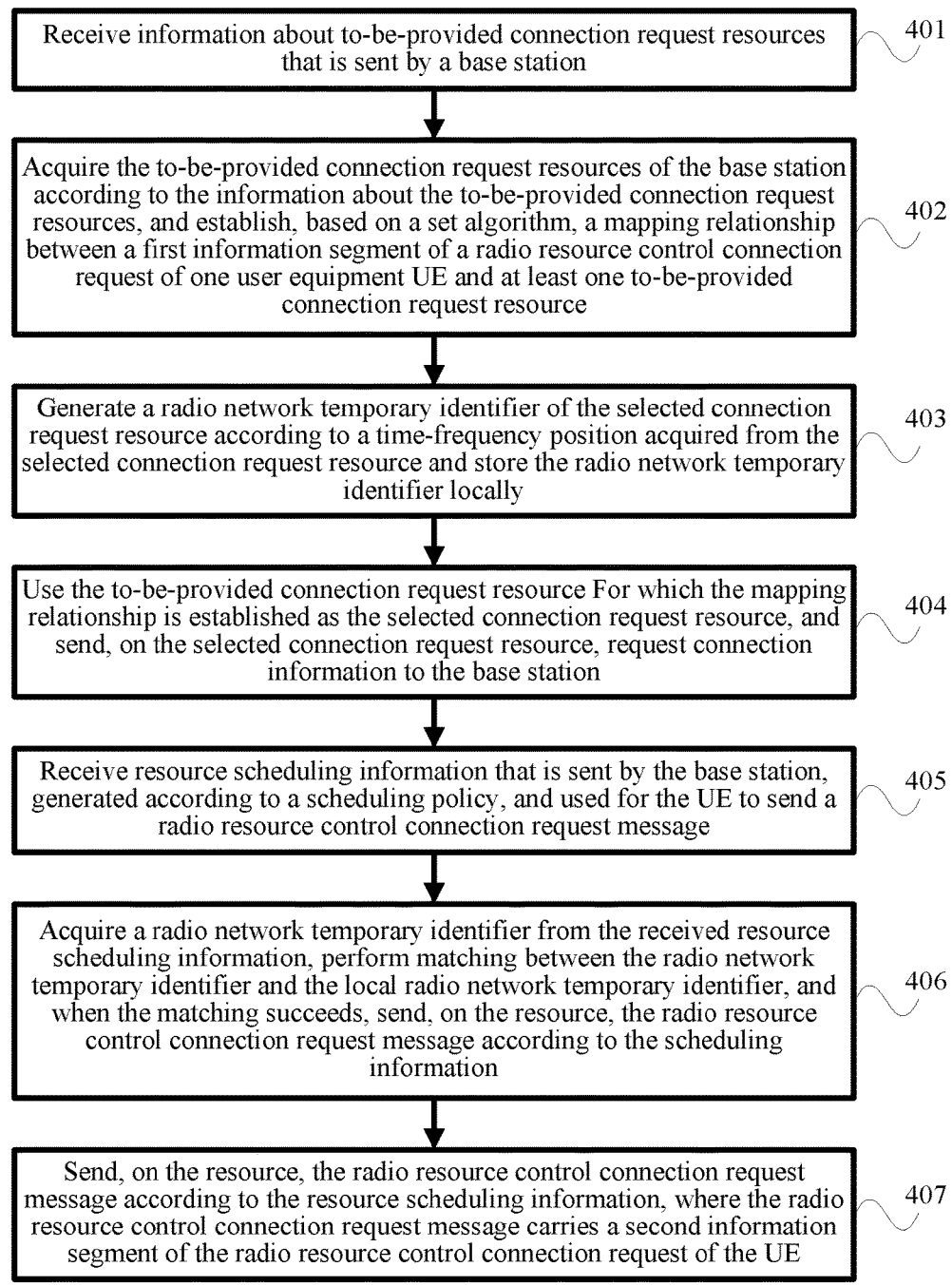
FIG. 4 is a flowchart of yet another embodiment of a connection setup method according to the present invention.

FIG. 4 is a flowchart of yet another embodiment of a connection setup method according to the present invention. Based on the foregoing embodiment, a step of generating a radio network temporary identifier of the selected connection request resource is added in this embodiment. As shown in FIG. 4, the method specifically includes the following steps:

Step 401: Receive information about to-be-provided connection request resources that is sent by a base station.

In this step, a to-be-provided connection request resource is a resource that an eNB can provide for use of a UE when the UE requests to establish a connection, for example, the to-be-provided connection request resource may be: a PRACH resource and a preamble sequence (Preamble) sent on the PRACH resource, or an SR resource.

Further, if the connection request resource is a common scheduling request resource, before the receiving information about to-be-provided connection request resources that is sent by a base station, the method further includes: acquiring uplink time synchronization information, so that the UE achieves uplink time synchronization before sending a radio resource control connection request message.

Information about a connection request resource includes an identifier of a to-be-provided connection request resource, the information about the to-be-provided connection request resources includes the information about the to-be-provided connection request resources described in any one of the foregoing embodiments, and details are not described herein again.

Step 402: Acquire the to-be-provided connection request resources of the base station according to the information about the to-be-provided connection request resources, and establish, based on a set algorithm, a mapping relationship between a first information segment of a radio resource control connection request of one user equipment UE and at least one to-be-provided connection request resource.

The set algorithm includes the set algorithm described in Embodiment 2, the first information segment of the radio resource control connection request includes the first information segment of the radio resource control connection request described in Embodiment 2, and details are not described herein again.

A preferred implementation manner of this step is: mapping, based on the set algorithm, at least one of an identifier of the user equipment, a connection reason, a device type, a connection service type, and a destination node address into an identifier of the connection request resource; and establishing a mapping relationship with the connection request resource that matches the identifier obtained through conversion.

Step 403: Generate a radio network temporary identifier of the selected connection request resource according to a time-frequency position acquired from the selected connection request resource and store the radio network temporary identifier locally.

The radio network temporary identifier of the connection request resource is a temporary authentication identifier for the UE and the eNB to identify a unique connection request resource in a current cell.

Step 404: Use the to-be-provided connection request resource for which the mapping relationship is established as the selected connection request resource, and send, on the selected connection request resource, request connection information to the base station.

Step 405: Receive resource scheduling information that is sent by the base station, generated according to a scheduling policy, and used for the UE to send a radio resource control connection request message.

In this step, optionally, if the connection request resource is a random access resource, the resource scheduling information includes: uplink time synchronization information assigned by the base station, so that uplink time synchronization is achieved before the radio resource control connection request message is sent.

Step 406: Acquire a radio network temporary identifier from the received resource scheduling information, perform matching between the radio network temporary identifier and the local radio network temporary identifier, and when the matching succeeds, send, on the resource, the radio resource control connection request message according to the scheduling information.

Step 407: Send, on the resource, the radio resource control connection request message according to the resource scheduling information, where the radio resource control connection request message carries a second information segment of the radio resource control connection request of the UE.

In this embodiment, a UE establishes a mapping relationship between a part of radio resource control connection request information of the UE and a connection request resource, so that the part of radio resource control connection request information is already implicitly sent before an RRC connection request is originated. When the RRC connection request is originated, only remaining radio resource control connection request information needs to be sent, so that a quantity of information carried in the RRC connection request is reduced; and a current RRC connection request message is extended so as to accommodate the access of more types of users and notify a network, so that the network selects to use different optimization solutions to resolve the problem that setup of RRC connections for a large quantity of user terminals cannot be supported because of a limited length of information carried in an RRC connection request, causing congestion and delays during communication of the user terminals.

Based on the technical solution of the foregoing embodiment, preferably, the connection request resource is an SR resource. Because there are more SR resources than PRACH resources in the prior art, there is also more RRC connection request information that can be implicitly sent, so that more resources are saved, and access of more users can be supported; therefore, such a solution is more applicable to a Common SR scheme.

The technical solutions in the method embodiments shown in FIG. 1 to FIG. 4 are described in detail below by using a specific embodiment.

Figure 5:
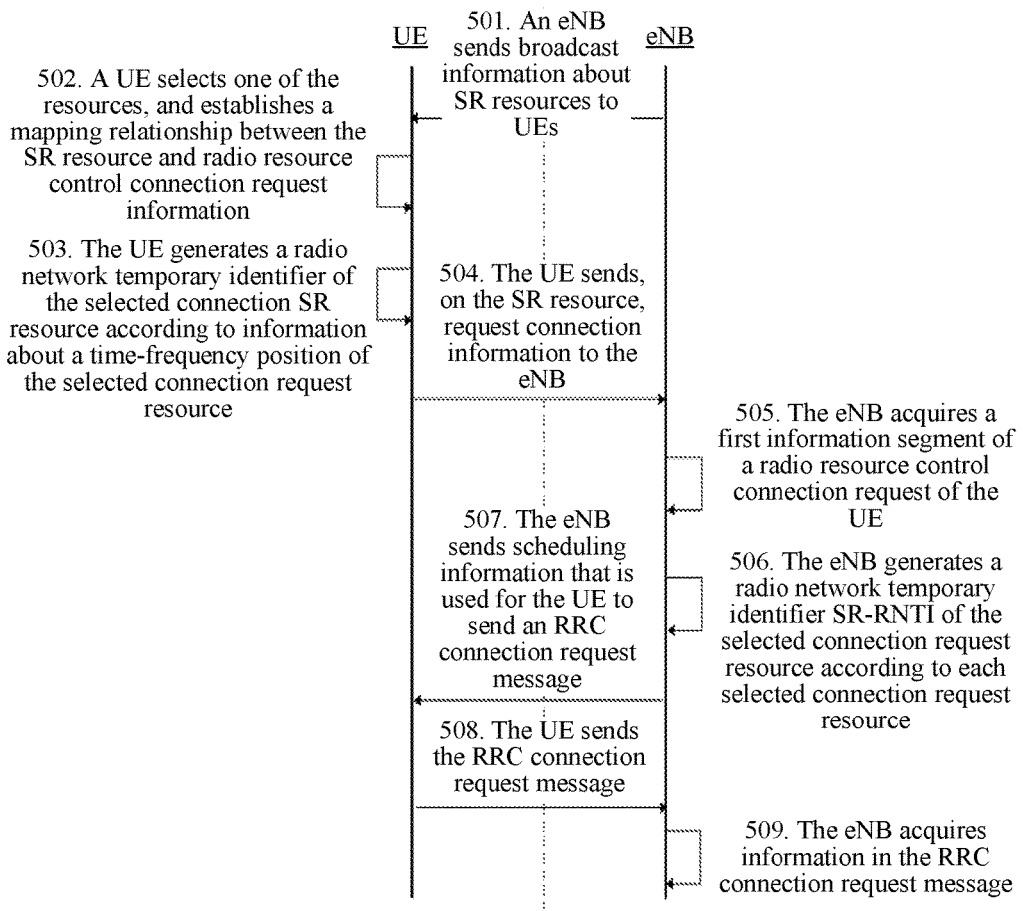
FIG. 5 is a flowchart of another embodiment of a connection setup method according to the present invention.

FIG. 5 is a flowchart of another embodiment of a connection setup method according to the present invention. A complete embodiment may be provided based on any one of the foregoing embodiments. In this embodiment, it is assumed that a connection request resource is an SR resource, and RRC connection request information that participates in mapping is an identifier of a UE. As shown in FIG. 5, the method includes the following steps:

Step 501: An eNB sends broadcast information about SR resources to UEs.

The eNB assigns some SR resources, which are mainly assigned according to a quantity of such UEs that exist in a cell currently, identifies the assigned SR resources, and broadcasts related information of the SR resources to the related UEs in the cell.

Before step 501, the UE needs to perform initial access. When the UE performs initial access to achieve uplink time synchronization of initial access, for a cell with a very small radius which means that a length of a CP can overcome a problem brought by uplink out-of-synchronization, and because the CP is already capable of handling impact caused by a transmission delay, a Preamble does not need to be used to perform initial access to achieve uplink synchronization.

Step 502: A UE selects one of the SR resources, and establishes a mapping relationship between the SR resource and radio resource control connection request information.

The UE in the cell receives the SR resources broadcast by the eNB, and selects one SR resource thereof according to a set algorithm. The algorithm may be simple mapping, for example, an SR resource that belongs to the UE is obtained through calculation according to an identifier of the UE, for example, an S-TMSI, a random number, or the like. A calculation method is relatively simple, and may be implemented by mapping the identifier of the UE, for example, the S-TMSI, to the SR resource. More specifically, the SR resource may be selected according to a remainder obtained after a modulo operation is performed on the S-TMSI and a specific value (for example, a quantity of SR resources). The calculation method may be similar to a calculation manner of Paging.

For example, a maximum identifier of the UE is 1024, that is, a length of 10 bits, and there are 128 SR resources in one period currently, that is, a length of 7 bits, for these UEs to use. If a UE has an identifier 1000, 1000 mod 128=104, and a last-7-bit numerical value of the user, that is, 104, is mapped to an SR resource, that is, in this case, the user equipment selects the $104^{th}$ SR resource to originate access, which is equivalent to implicitly mapping a last-7-bit identifier of the user equipment.

When the UE has no S-TMSI, an RRC Connection Request carries a string of a random number. Herein, the random number may also be reported to the eNB in a similar manner.

When the connection request resource is a PRACH resource, a calculation manner may be slightly different herein, but the concept is the same. A PRACH time, frequency, or code resource is mapped to the identifier of the UE, thereby achieving an objective of reducing a length of a displayed reported identifier of the UE.

Step 503: The UE generates a radio network temporary identifier of the selected connection SR resource according to information about a time-frequency position of the selected connection request resource.

In this step, a radio network temporary identifier is generated according to the information about the time-frequency position of the selected connection request resource. For example, the radio network temporary identifier is defined as an SR-RNTI, to identify SR resources of different UEs. An objective of setting the SR-RNTI is to distinguish different SR resources in a same cell.

Step 504: The UE sends, on the SR resource, request connection information to the eNB.

Step 505: The eNB acquires a first information segment of a radio resource control connection request of the UE.

For example, the eNB acquires the $104^{th}$ SR resource selected by the UE, and then, can acquire the last-7-bit identifier of the UE according to the mapping relationship in step 502.

Step 506: The eNB generates a radio network temporary identifier SR-RNTI of the selected connection request resource according to each selected connection request resource.

Step 507: The eNB sends scheduling information that is used for the UE to send an RRC connection request message.

The eNB sends the scheduling information for the connection setup request to the UE, where the scheduling information carries the radio network temporary identifier SR-RNTI generated in step 506.

Step 508: The UE sends the RRC connection request message.

When the UE is in an idle mode, if the UE requests to establish a signaling connection, the UE may send, on a time or frequency resource that corresponds to the scheduling information, the RRC connection request message according to the scheduling information of the RRC connection request message that is received from the eNB. Because the identifier of 7 bits is already implicitly uploaded in step 502 to step 505, if a length of the identifier of the UE is 10 bits, only an identifier of the remaining 3 bits needs to be uploaded at this time.

Step 509: The eNB acquires information in the RRC connection request message.

The eNB obtains the entire 10-bit identifier of the UE through combination and calculation according to the acquired 7-bit identifier of the UE in step 405 and the remaining 3-bit identifier acquired when an RRC connection setup request is sent in step 408.

In this embodiment, an identifier of a UE is mapped to an SR resource, and the UE already implicitly uploads a partial identifier of the UE before requesting to establish a signaling connection, so that when the UE requests to establish the signaling connection, only a remaining identifier other than the partial identifier of the UE needs to be uploaded, so that a quantity of information carried in an RRC connection request message is reduced, and the RRC connection request message is extended, thereby resolving a connection setup problem that a large quantity of UEs cannot be connected because of a limited a length of information in an RRC connection request message.

Based on this embodiment, further, the foregoing solution may be further extended as follows:

The eNB may adjust a quantity of SR resources or extend a quantity of PRACH resources according to a quantity of users, a status of collision, and usage of connection request resources, thereby implementing flexible assignment and use of the connection request resources.

Based on this embodiment, further, a position of the SR resource may not only be mapped to the identifier (the S-TMSI, an IMSI, or a GUTI) of the UE, and a connection setup reason, but also may be mapped to information such as a service type (such as meter reading or intelligent transportation), or a destination node address, thereby further reducing air interface resources.

Figure 6:
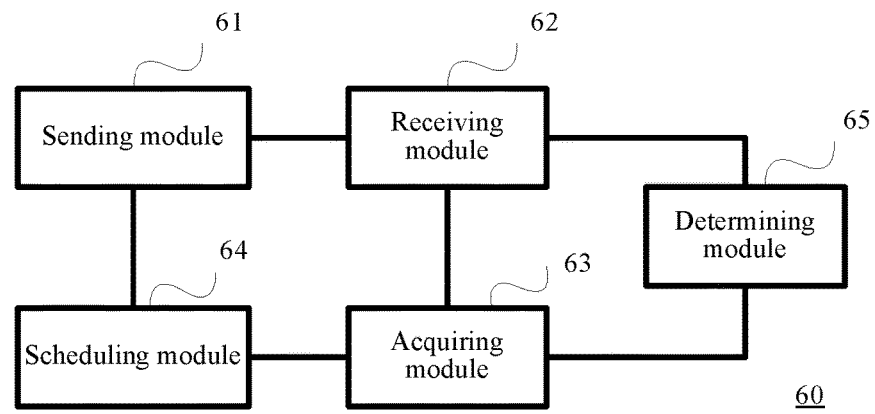
FIG. 6 is a schematic structural diagram of an embodiment of a connection setup apparatus according to the present invention.

FIG. 6 is a schematic structural diagram of an embodiment of a connection setup apparatus according to the present invention. The apparatus 60 is generally integrated in an eNB network element. As shown in FIG. 6, the apparatus 60 includes:

a sending module 61, configured to send information about to-be-provided connection request resources to a user equipment UE set;

a receiving module 62, configured to receive a connection request message that is sent on a selected connection request resource by one UE in the user equipment set, where the selected connection request resource is selected, by the UE, from the to-be-provided connection request resources sent by the sending module 61, and based on a set algorithm, a mapping relationship exists between the selected connection request resource and a first information segment of a radio resource control connection request of the UE;

an acquiring module 63, configured to acquire the first information segment of the radio resource control connection request of the UE according to the selected connection request resource received by the receiving module 62 and the mapping relationship;

a scheduling module 64, configured to generate, according to a scheduling policy, resource scheduling information that is used for the UE to send a radio resource control connection request message, where the sending module 61 is configured to send the resource scheduling information generated by the scheduling module 64, and the receiving module 62 is configured to receive the radio resource control connection request message that is sent, by the UE, on a radio resource that corresponds to the resource scheduling information, where the radio resource control connection request message carries a second information segment of the radio resource control connection request of the UE; and a determining module 65, configured to determine radio resource control connection request information of the UE according to the first information segment of the radio resource control connection request of the UE that is acquired by the acquiring module 63 and the second information segment, which is received by the receiving module 62, of the radio resource control connection request of the UE.

The apparatus in this embodiment is used to perform the technical solution of the method embodiment shown in FIG. 1, and their implementation principles and technical effects are similar, which are not described in detail herein again.

Figure 7:
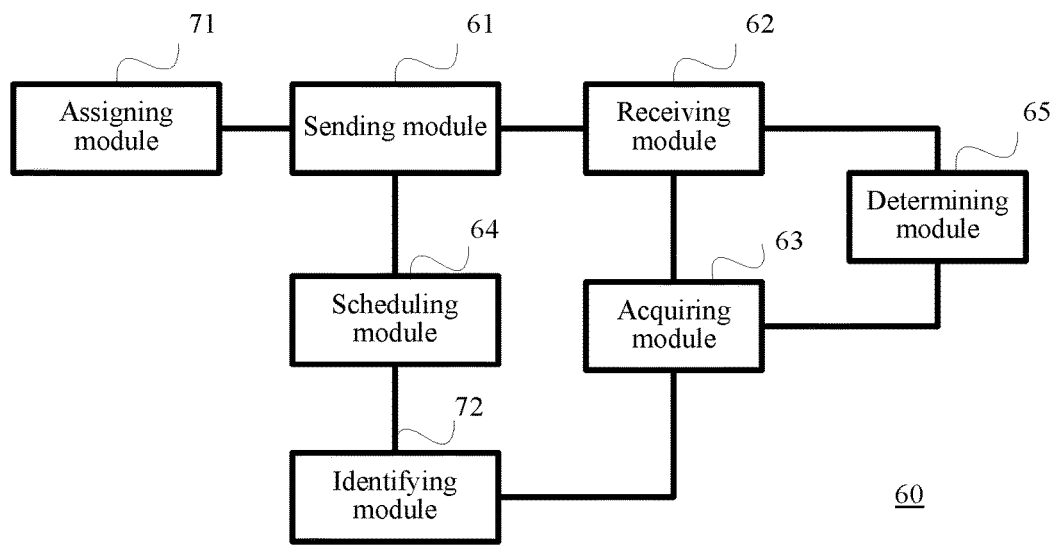
FIG. 7 is a schematic structural diagram of another embodiment of a connection setup apparatus according to the present invention.

FIG. 7 is a schematic structural diagram of another embodiment of a connection setup apparatus according to the present invention. As shown in FIG. 7, the apparatus in this embodiment is based on the structure of the apparatus shown in FIG. 6. Further, the connection request resource sent by the sending module 61 is a common scheduling request resource or a random access resource.

The apparatus further includes an assigning module 71, configured to: before the sending module sends to-be-provided common scheduling request resources to the user equipment UE set, assign uplink time synchronization information to the UE, so that the UE achieves uplink time synchronization before sending the request connection information.

The scheduling module 64 of the apparatus is configured to: when the connection request resource sent by the sending module 61 is a random access resource, generate resource scheduling information that includes uplink time synchronization information for the UE and assign the resource scheduling information to the UE, so that the UE achieves uplink time synchronization before sending the radio resource control connection request message.

The mapping module 63 is specifically configured to: map, based on the mapping relationship, an identifier of the selected connection request resource to at least one of an identifier of the user equipment, a connection reason, a device type, a connection service type, and a destination node address.

Optionally, the apparatus further includes: an identifying module 72, configured to: before the sending module sends the resource scheduling information generated by the scheduling module, generate a radio network temporary identifier of the selected connection request resource according to a time-frequency position of the selected connection request resource, and use the radio network temporary identifier to identify the resource scheduling information of the radio resource control connection request message.

The apparatus in this embodiment is used to perform the technical solution of the method embodiment shown in FIG. 2, and their implementation principles and technical effects are similar, which are not described in detail herein again.

Figure 8:
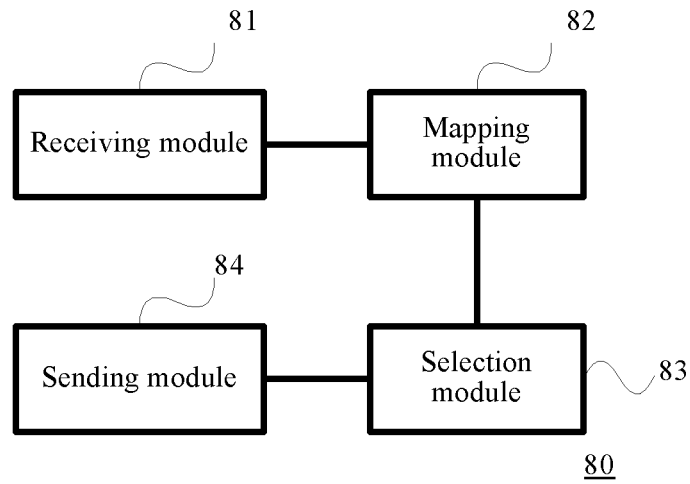
FIG. 8 is a schematic structural diagram of still another embodiment of a connection setup apparatus according to the present invention.

FIG. 8 is a schematic structural diagram of still another embodiment of a connection setup apparatus according to the present invention. The apparatus 80 is generally integrated in a UE network element. As shown in FIG. 8, the apparatus 80 includes:

a receiving module 81, configured to receive information about to-be-provided connection request resources that is sent by a base station;

a mapping module 82, configured to acquire the to-be-provided connection request resources of the base station according to the information about the to-be-provided connection request resources that is received by the receiving module, and establish, based on a set algorithm, a mapping relationship between a first information segment of a radio resource control connection request of one user equipment UE and at least one to-be-provided connection request resource;

a selection module 83, configured to use the to-be-provided connection request resource for which the mapping module establishes the mapping relationship as a selected connection request resource; and a sending module 84, configured to send, on the connection request resource selected by the selection module, request connection information to the base station, where the receiving module 81 is configured to receive resource scheduling information that is sent by the base station, generated according to a scheduling policy, and used for the UE to send a radio resource control connection request message; and the sending module 84 is configured to send, on a radio resource that corresponds to the resource scheduling information, the radio resource control connection request message according to the resource scheduling information, where the radio resource control connection request message carries a second information segment of the radio resource control connection request of the UE.

The apparatus in this embodiment is used to perform the technical solution of the method embodiment shown in FIG. 3, and their implementation principles and technical effects are similar, which are not described in detail herein again.

Figure 9:
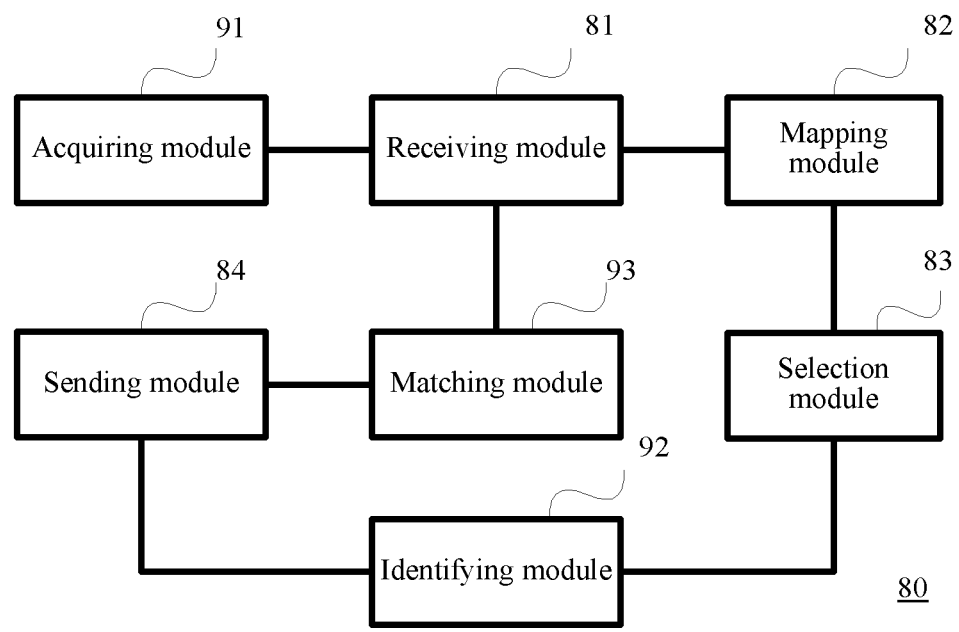
FIG. 9 is a schematic structural diagram of yet another embodiment of a connection setup apparatus according to the present invention.

FIG. 9 is a schematic structural diagram of yet another embodiment of a connection setup apparatus according to the present invention. As shown in FIG. 9, the apparatus in this embodiment is based on the structure of the apparatus shown in FIG. 8. Further, the connection request resource received by the receiving module is a common scheduling request resource or a random access resource.

The apparatus further includes an acquiring module 91, configured to: before the receiving module 81 receives to-be-provided common scheduling request resources, acquire uplink time synchronization information, so that the UE achieves uplink time synchronization before sending the radio resource control connection request message.

The receiving module 81 is configured to: when the received connection request resource is a random access resource, receive resource scheduling information that includes uplink time synchronization information assigned by the base station, so that uplink time synchronization is achieved before the radio resource control connection request message is sent.

The mapping module 82 is specifically configured to:

convert, based on the set algorithm, at least one of an identifier of the UE, a connection reason, a device type, a connection service type, and a destination node address into an identifier of the connection request resource; and establish a mapping relationship with the connection request resource that matches the identifier obtained through conversion.

Optionally, the apparatus further includes: an identifying module 92, configured to: before the sending module 84 uses the to-be-provided connection request resource for which the mapping relationship is established as the selected connection request resource, and sends, on the selected connection request resource, the request connection information to the base station, generate a radio network temporary identifier of the selected connection request resource according to a time-frequency position acquired from the selected connection request resource and store the radio network temporary identifier locally; and correspondingly, the apparatus further includes: a matching module 93, configured to: before the sending module 84 sends, on the radio resource, the radio resource control connection request message according to the resource scheduling information, acquire a radio network temporary identifier from the resource scheduling information received by the receiving module 81, perform matching between the radio network temporary identifier and the local radio network temporary identifier, and when the matching succeeds, send, on the resource, the radio resource control connection request message according to the scheduling information.

The apparatus in this embodiment is used to perform the technical solution of the method embodiment shown in FIG. 4, and their implementation principles and technical effects are similar, which are not described in detail herein again.

Figure 10:
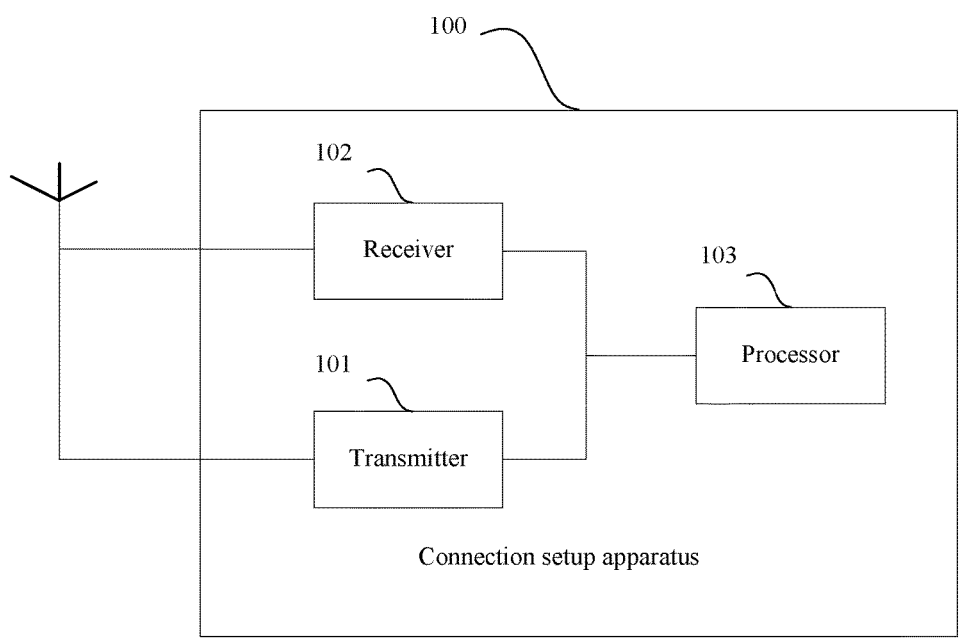
FIG. 10 is a schematic structural diagram of another embodiment of a connection setup apparatus according to the present invention.

FIG. 10 is a schematic structural diagram of another embodiment of a connection setup apparatus according to the present invention. As shown in FIG. 10, the connection setup apparatus 100 provided in this embodiment includes:

a transmitter 101, configured to send information about to-be-provided connection request resources to a user equipment UE set;

a receiver 102, configured to receive a connection request message that is sent on a selected connection request resource by one UE in the user equipment set, where the selected connection request resource is selected, by the UE, from the to-be-provided connection request resources sent by the transmitter, and based on a set algorithm, a mapping relationship exists between the selected connection request resource and a first information segment of a radio resource control connection request of the UE; and a processor 103, configured to acquire the first information segment of the radio resource control connection request of the UE according to the selected connection request resource and the mapping relationship, where the processor 103 is configured to generate, according to a scheduling policy, resource scheduling information that is used for the UE to send a radio resource control connection request message;

the transmitter 101 is configured to send the resource scheduling information generated by the processor;

the receiver 102 is configured to receive the radio resource control connection request message that is sent, by the UE, on a radio resource that corresponds to the resource scheduling information, where the radio resource control connection request message carries a second information segment of the radio resource control connection request of the UE; and the processor 103 is configured to determine radio resource control connection request information of the UE according to the first information segment of the radio resource control connection request and the second information segment, which is received by the receiver, of the radio resource control connection request.

In this embodiment, the processor 103 executes the executable instructions, so that the connection setup apparatus performs the method shown in FIG. 1, and their implementation principles and technical effects are similar, which are not described in detail herein again.

Based on this embodiment, further, the connection request resource sent by the transmitter 101 is a common scheduling request resource or a random access resource.

Based on this embodiment, optionally, the processor 103 is further configured to:

before the transmitter 101 sends to-be-provided common scheduling request resources to the user equipment UE set, assign uplink time synchronization information to the UE, so that the UE achieves uplink time synchronization before sending the radio resource control connection request information.

Based on this embodiment, specifically, the processor 103 is specifically configured to: when the connection request resource sent by the transmitter 101 is a random access resource, generate resource scheduling information that includes uplink time synchronization information for the UE and assign the resource scheduling information to the UE, so that the UE achieves uplink time synchronization before sending the radio resource control connection request message.

Based on this embodiment, specifically, the processor 103 is specifically configured to:

convert, based on the mapping relationship, an identifier of the selected connection request resource to at least one of an identifier of the UE, a connection reason, a device type, a connection service type, and a destination node address.

Based on this embodiment, further, the processor 103 is further configured to: before the transmitter sends the generated resource scheduling information, generate a radio network temporary identifier of the selected connection request resource according to a time-frequency position of the selected connection request resource, and use the radio network temporary identifier to identify the resource scheduling information of the radio resource control connection request message.

Figure 11:
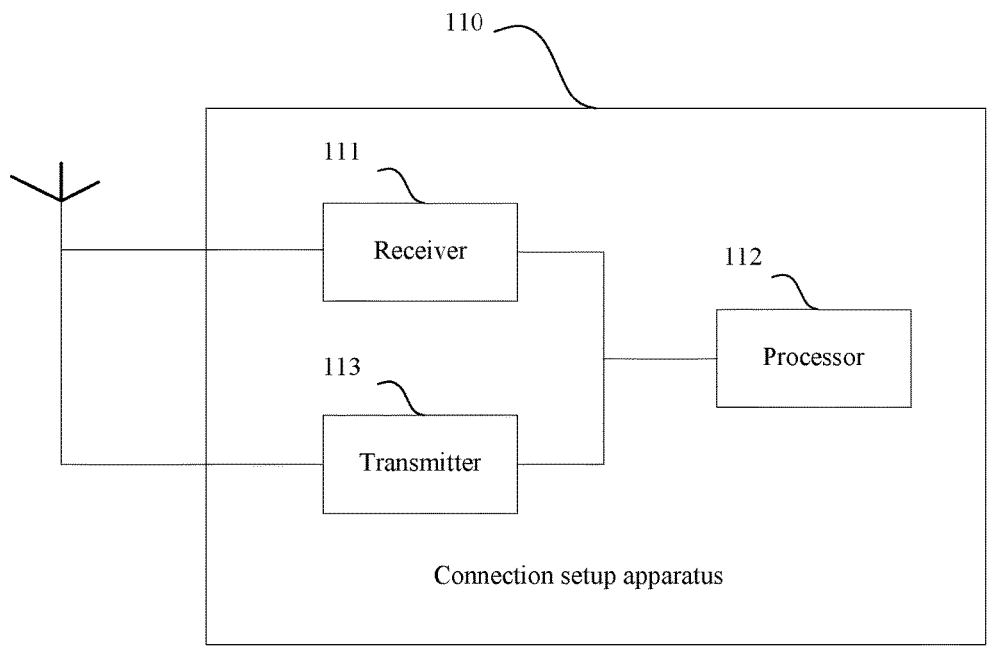
FIG. 11 is a schematic structural diagram of still another embodiment of a connection setup apparatus according to the present invention.

FIG. 11 is a schematic structural diagram of still another embodiment of a connection setup apparatus according to the present invention. As shown in FIG. 11, the connection setup apparatus 110 provided in this embodiment includes:

a receiver 111, configured to receive information about to-be-provided connection request resources that is sent by a base station;

a processor 112, configured to acquire the to-be-provided connection request resources of the base station according to the information about the to-be-provided connection request resources that is received by the receiver, and establish, based on a set algorithm, a mapping relationship between a first information segment of a radio resource control connection request of one user equipment UE and at least one to-be-provided connection request resource, where the processor 112 is configured to use the to-be-provided connection request resource for which the mapping relationship is established as a selected connection request resource; and a transmitter 113, configured to send, on the connection request resource selected by the processor, request connection information to the base station, where the receiver 111 is configured to receive resource scheduling information that is sent by the base station, generated according to a scheduling policy, and used for the UE to send a radio resource control connection request message; and the transmitter 113 is configured to send, on a radio resource that corresponds to the resource scheduling information, the radio resource control connection request message according to the resource scheduling information, where the radio resource control connection request message carries a second information segment of the radio resource control connection request of the UE.

In this embodiment, the processor executes the executable instructions, so that the connection setup apparatus performs the method shown in FIG. 3, and their implementation principles and technical effects are similar, which are not described in detail herein again.

Based on this embodiment, specifically, the connection request resource received by the receiver 111 is a common scheduling request resource or a random access resource.

Based on this embodiment, further, the processor 112 is further configured to: before the receiver receives to-be-provided common scheduling request resources, acquire uplink time synchronization information, so that the UE achieves uplink time synchronization before sending the radio resource control connection request message.

Based on this embodiment, specifically, the receiver 111 is configured to: when the received connection request resource is a random access resource, receive resource scheduling information that includes uplink time synchronization information assigned by the base station, so that uplink time synchronization is achieved before the radio resource control connection request message is sent.

Based on this embodiment, specifically, the processor 112 is specifically configured to:

convert, based on the set algorithm, at least one of an identifier of the UE, a connection reason, a device type, a connection service type, and a destination node address into an identifier of the connection request resource; and establish a mapping relationship with the connection request resource that matches the identifier obtained through conversion.

Based on this embodiment, further, the processor 112 is further configured to: before the transmitter uses the to-be-provided connection request resource for which the mapping relationship is established as the selected connection request resource, and sends, on the selected connection request resource, the request connection information to the base station, generate a radio network temporary identifier of the selected connection request resource according to a time-frequency position acquired from the selected connection request resource and store the radio network temporary identifier locally; and is configured to: before the transmitter 113 sends, on the radio resource, the radio resource control connection request message according to the request resource scheduling information, acquire a radio network temporary identifier from the resource scheduling information received by the receiver, perform matching between the radio network temporary identifier and the local radio network temporary identifier, and when the matching succeeds, send, on the resource, the radio resource control connection request message according to the scheduling information.

Figure 12:
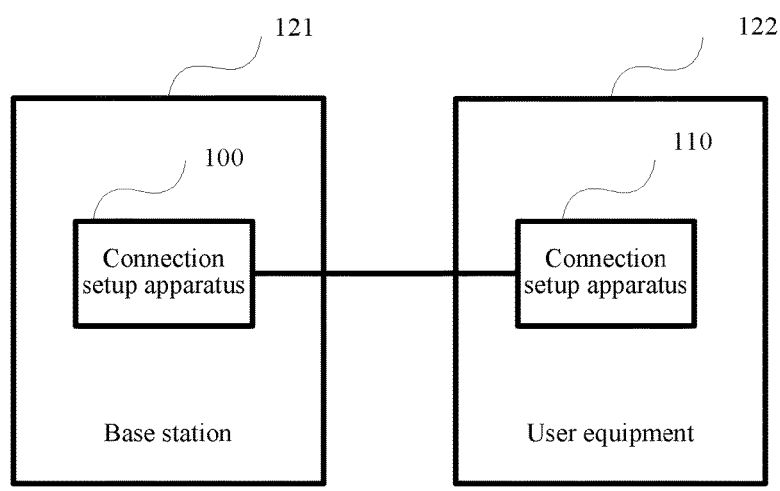
FIG. 12 is a schematic structural diagram of an embodiment of a connection setup system according to the present invention.

FIG. 12 is a schematic structural diagram of an embodiment of a connection setup system according to the present invention. As shown in FIG. 12, the connection setup system includes a base station 121 and user equipment 122, where the base station includes the connection setup apparatus 100 described in any one of the foregoing embodiments, and the user equipment includes the connection setup apparatus 110 described in any one of the foregoing embodiments.

The connection setup apparatus 100 in this embodiment may correspondingly perform the connection setup method on a base station side, which is provided in any one of the embodiments of the present invention, and implementation principles and technical effects are similar, which are not described in detail herein again.

The connection setup apparatus 110 in this embodiment may correspondingly perform the connection setup method on a terminal side, which is provided in any one of the embodiments of the present invention, and implementation principles and technical effects are similar, which are not described in detail herein again.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position or may be distributed on multiple network units. Some or all of the units may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, rather than to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, provided that such modifications or replacements do not make the essence of corresponding technical solutions to depart from the scope of the technical solutions of the embodiments of the present invention.

What is claimed is:

1. A connection setup method, comprising:
sending information about to-be-provided connection request resources to a user equipment (UE) set;
receiving a connection request message that is sent on a selected connection request resource by one UE in the user equipment set, wherein based on a set algorithm, a mapping relationship exists between the selected connection request resource and a first information segment of a radio resource control connection request of the UE;
acquiring the first information segment of the radio resource control connection request of the UE according to the selected connection request resource and the mapping relationship, wherein the acquiring the first information segment of the radio resource control connection request of the UE according to the selected connection request resource and the mapping relationship comprises:
converting, based on the mapping relationship, an identifier of the selected connection request resource to at least one of an identifier of the UE, a connection reason, a device type, a connection service type, and a destination node address;
sending, to the UE, resource scheduling information that is generated according to a scheduling policy and used for the UE to send a radio resource control connection request message;
receiving the radio resource control connection request message that is sent, by the UE, on a radio resource that corresponds to the resource scheduling information, wherein the radio resource control connection request message carries a second information segment of the radio resource control connection request of the UE; and
determining radio resource control connection request information of the UE according to the first information segment of the radio resource control connection request and the second information segment of the radio resource control connection request,
wherein the connection request resource is a common scheduling request resource or a random access resource,
if the connection request resource is a common scheduling request resource, before the sending information about to-be-provided connection request resources to a UE set, further comprising:
assigning uplink time synchronization information to the UE, so that the UE achieves uplink time synchronization before sending the radio resource control connection request message.

2. The method according to claim 1, wherein if the connection request resource is a random access resource, the resource scheduling information comprises:
uplink time synchronization information assigned to the UE, so that the UE achieves uplink time synchronization before sending the radio resource control connection request message.

3. A connection setup method, comprising:
receiving information about to-be-provided connection request resources that is sent by a base station;
acquiring the to-be-provided connection request resources of the base station according to the information about the to-be-provided connection request resources, and establishing, based on a set algorithm, a mapping relationship between a first information segment of a radio resource control connection request of one user equipment (UE) and at least one to-be-provided connection request resource, wherein the acquiring the to-be-provided connection request resources of the base station according to the information about the to-be-provided connection request resources, and establishing, based on a set algorithm, a mapping relationship between a first information segment of a radio resource control connection request of one UE and at least one to-be-provided connection request resource comprises:

converting, based on the set algorithm, at least one of an identifier of the UE, a connection reason, a device type, a connection service type, and a destination node address into an identifier of the connection request resource; and establishing a mapping relationship with the connection request resource that matches the identifier obtained through conversion;

using the to-be-provided connection request resource for which the mapping relationship is established as a selected connection request resource, and sending, on the selected connection request resource, request connection information to the base station;

receiving resource scheduling information that is sent by the base station, generated according to a scheduling policy, and used for the UE to send a radio resource control connection request message; and sending, on a radio resource that corresponds to the resource scheduling information, the radio resource control connection request message according to the resource scheduling information, wherein the radio resource control connection request message carries a second information segment of the radio resource control connection request of the UE, wherein the connection request resource is a common scheduling request resource or a random access resource, if the connection request resource is a common scheduling request resource, before the receiving information about to-be-provided connection request resources that is sent by a base station, further comprising:

acquiring uplink time synchronization information, so that the UE achieves uplink time synchronization before sending the radio resource control connection request message.

4. The method according to claim 3, wherein if the connection request resource is a random access resource, the resource scheduling information comprises:

uplink time synchronization information assigned by the base station, so that uplink time synchronization is achieved before the radio resource control connection request message is sent.

5. A connection setup apparatus, comprising:

a transmitter, configured to send information about to-be-provided connection request resources to a user equipment (UE) set;

a receiver, configured to receive a connection request message that is sent on a selected connection request resource by one UE in the user equipment set, wherein the selected connection request resource is selected, by the UE, from the to-be-provided connection request resources sent by the transmitter, and based on a set algorithm, a mapping relationship exists between the selected connection request resource and a first information segment of a radio resource control connection request of the UE; and a processor, configured to acquire the first information segment of the radio resource control connection request of the UE according to the selected connection request resource and the mapping relationship, wherein the processor is configured to generate, according to a scheduling policy, resource scheduling information that is used for the UE to send a radio resource control connection request message;

the transmitter is configured to send the resource scheduling information generated by the processor;

the receiver is configured to receive the radio resource control connection request message that is sent, by the UE, on a radio resource that corresponds to the resource scheduling information, wherein the radio resource control connection request message carries a second information segment of the radio resource control connection request of the UE; and the processor is configured to determine radio resource control connection request information of the UE according to the first information segment of the radio resource control connection request and the second information segment, which is received by the receiver, of the radio resource control connection request, wherein the connection request resource sent by the transmitter is a common scheduling request resource or a random access resource, wherein the processor is further configured to:
before the transmitter sends to-be-provided common scheduling request resources to the UE set, assign uplink time synchronization information to the UE, so that the UE achieves uplink time synchronization before sending the radio resource control connection request information, and wherein the processor is further configured to:
convert, based on the mapping relationship, an identifier of the selected connection request resource to at least one of an identifier of the UE, a connection reason, a device type, a connection service type, and a destination node address.

6. The apparatus according to claim 5, wherein the processor is configured to: when the connection request resource sent by the transmitter is a random access resource, generate resource scheduling information that comprises uplink time synchronization information for the UE and assign the resource scheduling information to the UE, so that the UE achieves uplink time synchronization before sending the radio resource control connection request message.

7. The apparatus according to claim 5, wherein the processor is further configured to: before the transmitter sends the generated resource scheduling information, generate a radio network temporary identifier of the selected connection request resource according to a time-frequency position of the selected connection request resource, and use the radio network temporary identifier to identify the resource scheduling information of the radio resource control connection request message.

8. A connection setup apparatus, comprising:

a receiver, configured to receive information about to-be-provided connection request resources that is sent by a base station;

a processor, configured to acquire the to-be-provided connection request resources of the base station according to the information about the to-be-provided connection request resources that is received by the receiver, and establish, based on a set algorithm, a mapping relationship between a first information segment of a radio resource control connection request of one user equipment (UE) and at least one to-be-provided connection request resource, wherein the processor is configured to use the to-be-provided connection request resource for which the mapping relationship is established as a selected connection request resource; and a transmitter, configured to send, on the connection request resource selected by the processor, request connection information to the base station, wherein the receiver is configured to receive resource scheduling information that is sent by the base station, generated according to a scheduling policy, and used for the UE to send a radio resource control connection request message; and the transmitter is configured to send, on a radio resource that corresponds to the resource scheduling information, the radio resource control connection request message according to the resource scheduling information, wherein the radio resource control connection request message carries a second information segment of the radio resource control connection request of the UE, wherein the connection request resource received by the receiver is a common scheduling request resource or a random access resource, wherein the processor is further configured to: before the receiver receives to-be-provided common scheduling request resources, acquire uplink time synchronization information, so that the UE achieves uplink time synchronization before sending the radio resource control connection request message, and wherein the processor is further configured to:

convert, based on the mapping relationship, an identifier of the selected connection request resource to at least one of an identifier of the UE, a connection reason, a device type, a connection service type, and a destination node address.

9. The apparatus according to claim 8, wherein the receiver is configured to: when the received connection request resource is a random access resource, receive resource scheduling information that comprises uplink time synchronization information assigned by the base station, so that uplink time synchronization is achieved before the radio resource control connection request message is sent.

* * * * *